Patented July 21, 1953

2,646,382

UNITED STATES PATENT OFFICE 2,646,382

ANTHELMINTIC COMPOSITIONS

Arthur Henry Craige, Jr., Riverdale, Md., assignor to Allied Laboratories, Inc., Kansas City, Mo., a corporation of Delaware No Drawing. Application March 28, 1951, Serial No. 218,070

6 Claims. (Cl. 167—53)

The present invention relates to anthelmintics and is directed to novel compositions and methods for the elimination of worms from the alimentary tract of higher animals. More particularly, it relates to anthelmintic compositions comprising aqueous suspensions containing as the essential active ingredients at least one of the compounds represented by the following general formula:

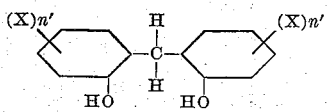

in which X represents a halogen selected from the group consisting of chlorine and bromine and $n'$ represents 1, 2, 3, or 4 and salts of such compounds. Specific compounds falling within this class include 2,2' - dihydroxy - 5,5' - dichlorodiphenylmethane, 2,2'-dihydroxy-5,5'-dibromodiphenylmethane, 2,2'-dihydroxy-3,5, 3',5'-tetrachlorodiphenylmethane, 2,2'-dihydroxy-3,5,3',5'-tetrabromodiphenylmethane, 2,2'-dihydroxy-3,5,6,3',5',6'-hexachlorodiphenylmethane, 2,2'-dihydroxy - 3,4,5,6,3',4',5',6' - octachlorodiphenylmethane, 2,2'-dihydroxy-5,5'-dibromo-3,6,3',6'-tetrachlorodiphenylmethane, 2,2' - dihydroxy-3,5,6,3',5',6' - hexabromodiphenylmethane, and their salts including alkali metal, alkaline earth metal, and heavy metal salts.

In accordance with the present invention, it has been discovered that anthelmintic compositions comprising aqueous suspensions containing as the active ingredient a compound as illustrated by the above formula are extremely efficient anthelmintics when administered internally to higher animals infested with worms. It is an advantage of the present invention that my anthelmintic compositions possess a high therapeutic index, i. e., a relatively low toxicity at the effective anthelmintic doses. While my compositions are generally useful for the treatment of worm infestations of the alimentary tract of higher animals, it is an advantage that they are especially effective in the treatment of tapeworm infestations.

The following specific description of tests carried out will serve to illustrate the effectiveness of my anthelmintic compositions. The descriptions are solely for purposes of illustration and are not to be construed as limiting the scope of the invention.

In preliminary tests, groups of dogs chosen at random from a supply of animals used for biological purposes were given oral doses of my anthelmintic drugs varying from 30 to 600 milligrams per kilogram of body weight. The animals were killed 48–96 hours after they had been dosed, and the entire gastro-intestinal tract of each was examined for the presence of parasites. It was established by similar examination of untreated dogs from the same source that about 65% of the dogs of this age, type, and source were infested with tapeworms and that many of them were also infested with roundworms.

These preliminary tests were designed primarily to test taenicidal action, but it was noted that 2,2'-dihydroxy-5,5'-dichlorodiphenylmethane, 2,2'-dihydroxy-5,5'-dibromodiphenylmethane, and 2,2'-dihydroxy-3,5,6,3',5',6'-hexachlorodiphenylmethane possessed ascaricidal action in vivo. Ascarids were expelled with the feces of the dogs following oral administration of the compositions. In several instances where ascarids had not been observed in the stools, they were found upon autopsy in the lower bowel obviously damaged and ready to be expelled.

In the preliminary in vivo tests, it was apparent that my compositions possessed outstanding taenicidal action. This is illustrated in the following table summarizing the results obtained with a representative composition of mine and with two commonly used taenicidal agents.

Summary of preliminary in vivo experiments on taenicidal action

| Anthelmintic composition | Oral dose, Mgm./Kgm. | Total Dogs | Autopsy Findings | | Percent not eliminated |
|---|---|---|---|---|---|
| | | | Present | Absent | |
| Controls (untreated) | | 20 | 13 | 7 | 65 |
| 2,2'-dihydroxy-5,5'-dichlorodiphenylmethane | 30–600 | 51 | 8 | 43 | 16 |
| Arecolin hydrobromide | 1–2 | 26 | 8 | 18 | 31 |
| Kamala, powdered | 150–600 | 10 | 2 | 8 | 20 |

In critical tests, natural infestation was determined in a series of dogs by repeated daily examination of their feces for segments of tapeworms or roundworms. The reliability of this method for establishing the presence of infestation was found to be 100%. Dogs thus shown to be infested were given an oral dose of the test drug and were observed closely during the following period until they were killed, 48–96 hours after the dose had been given. During this interval, their feces was screened for worms or fragments of worms. After death, the entire gastrointestinal canal of each dog was slit open and examined closely for the presence of parasites remaining after treatment. The taenicidal action is summarized in the following table.

mintics were employed. I am convinced, however, that the entire class is useful as anthelmintics, it being expected, of course, that the degree of activity will vary from compound to compound and from species to species. The Platyhelminthes, illustrated by dog tapeworms, and the Coelhelminthes, illustrated by hog ascarids and dog ascarids are likewise only specific illustrations. During toxicity studies in mice, some of them passed mouse tapeworms in their feces which further illustrates the effectiveness of my anthelmintic compositions in another species of warm-blooded animals.

Extensive toxicity studies indicate that the fatal dose for dogs is about 3.0 grams per kilogram for one of my preferred active ingredients,

*Summary of critical in vivo experiments on taenicidal action*

| Anthelmintic composition | Dosage, Mgm./Kgm. | No. Dogs | Results—based on post-mortem finding, Taenicidal Action | | | | | |
|---|---|---|---|---|---|---|---|---|
| | | | Complete | | Partial | | None | |
| | | | No. Dogs | Percent | No. Dogs | Percent | No. Dogs | Percent |
| 2,2'-dihydroxy-5,5'-dichlorodiphenylmethane | 200 | 20 | 18 | 90.0 | 2 | 10.0 | | |
| Do | 150 | 20 | 15 | 75.0 | 3 | 15.0 | 2 | 10.0 |
| Do | 100 | 20 | 15 | 75.0 | 3 | 15.0 | 2 | 10.0 |
| Do | 50 | 20 | 15 | 75.0 | 3 | 15.0 | 2 | 10.0 |
| 2,2'-dihydroxy-4,4'-dimethyl 5,5'-dichlorodiphenylmethane | 200 | 6 | 5 | 83.0 | 1 | 17.0 | | |
| Do | 50 | 10 | 5 | 50.0 | 3 | 30.0 | 2 | 20.0 |
| 2,2'-dihydroxy-5,5'-dibromomethane | 200 | 3 | 3 | 100.0 | | | | |
| Do | 50 | 10 | 7 | 70.0 | 2 | 20.0 | 1 | 10.0 |
| 2,2'-dihydroxy-3,5,6,3',5',6'-hexachlorodiphenylmethane | 50 | 10 | 10 | 100.0 | | | | |
| Kamala | 50 | 8 | 1 | 13 | 3 | 38.0 | 4 | 50.0 |

Taenicidal action by the representative members of my class of anthelmintics as shown in the above table was indicated in the majority of cases by complete absence of tapeworms from the gastro-intestinal tract. In a few instances, however, there was distinct evidence of action, yet a few worms remained. These were usually free in the lumen of the bowel, rather than attached to the wall, as is normal for the dog tapeworms, and in some cases, the worms showed unmistakable evidence of degeneration. These cases are listed in the above table as indicating "partial" taenicidal action which is to be interpreted as a distinct action but only partial elimination in the period of time allowed. It is noted that in every instance my compositions show a greater taenicidal action than Kamala, one of the commonly used taenicides for dogs.

The ascaricidal action of a representative member of my anthelmintic compositions is illustrated in a critical in vivo test—the results being set forth in the following table.

*Summary of critical in vivo experiments (ascaricidal)*

| No. dogs | Anthelmintic | Ascaricidal Action (Based on autopsy findings) | | Percent of dogs—complete ascarid elimination |
|---|---|---|---|---|
| | | Present | Absent | |
| 13 | 2,2'-dihydroxy-5,5'-dichlorodiphenylmethane, 150 to 200 mgm./kgm. | 10 | 3 | 23.0 |
| 5 | Oil of Chenopodium, 0.01 cc./kg. | 2 | 3 | 60.0 |
| 1 | N-butyl chloride, 0.5 cc./kg. | 1 | 0 | 0.0 |

In the foregoing anthelmintic experiments representative members of my class of anthelmintics were employed. I am convinced, however, that the entire class is useful as anthelmintics, it being expected, of course, that the degree of activity will vary from compound to compound and from species to species.

namely, 2,2'-dihydroxy-5,5'-dichlorodiphenylmethane, thus affording a therapeutic ratio of 15 based upon an anthelmintic dose of 200 mgm. per kgm. or 60 based upon 50 mgm. per kgm.

The quantity of active ingredient in my aqueous suspensions can be varied considerably in accordance with the skill of the art to give a preparation having the desired physical characteristics and at the same time suitable for administering an effective dose of the active ingredient. The term "aqueous suspension" is used to designate aqueous liquid preparations containing suspended solid substances and intended for internal use. The preferred aqueous suspensions are those wherein the active ingredient is present in effective quantities for administering doses of from about 30 to 600 milligrams per kilogram of the animal being treated. Therefore, my anthelmintic compositions comprise aqueous suspensions which contain at least 2% of at least one of the compounds as represented by the general formula on page 1 of this specification as the essential active ingredient.

It is to be distinctly understood that my anthelmintic compositions are useful for combating internal parasites of the gastrointestinal tract of any domestic animal or fowl and of man.

It is obvious that the preceding descriptions are intended to be illustrative only, and they may be varied or modified to a considerable extent without departing from the spirit of the invention or sacrificing the advantages thereof. I do not, therefore, intend to limit my invention to the specific embodiments herein set forth except as indicated in the appended claims.

This is a continuation-in-part of my co-pending application, Serial No. 592,729, filed May 8, 1945, now abandoned.

I claim:

1. A veterinary anthelmintic composition comprising an aqueous liquid preparation containing suspended therein as the essential active ingredient an effective amount and at least about 2% of a solid substance represented by the following formula:

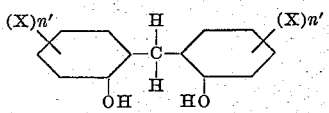

in which X represents a halogen selected from the group consisting of chlorine and bromine wherein said halogen substituents are arranged symmetrically and $n'$ is a small whole number from 1 to 4.

2. A veterinary anthelmintic composition comprising an aqueous liquid preparation containing suspended therein as the essential active ingredient an effective amount and at least about 2% of a solid substance represented by the following formula:

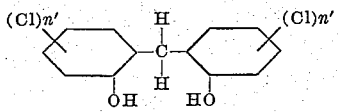

in which $n'$ is a small whole number from 1 to 4, and wherein one of the chlorines on each of the rings is in the 5 position, and wherein any additional chlorine substituents are arranged symmetrically.

3. A veterinary anthelmintic composition comprising an aqueous liquid preparation containing suspended therein as the essential active ingredient an effective amount and at least about 2% of a solid substance represented by the following formula:

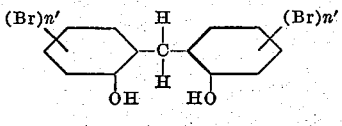

in which $n'$ is a small whole number from 1 to 4, and wherein one of the bromines on each of the rings is in the 5 position, and wherein any additional bromine substituents are arranged symmetrically.

4. A veterinary anthelmintic composition comprising an aqueous liquid preparation containing suspended therein as the essential active ingredient an effective amount and at least about 2% of 2,2'-dihydroxy-5,5'-dichlorodiphenylmethane.

5. A veterinary anthelmintic composition comprising an aqueous liquid preparation containing suspended therein as the essential active ingredient an effective amount and at least about 2% of 2,2'-dihydroxy-5,5'-dibromodiphenylmethane.

6. A veterinary anthelmintic composition comprising an aqueous liquid preparation containing suspended therein as the essential active ingredient an effective amount and at least about 2% of 2,2'-dihydroxy-3,5,6,3',5',6'-hexachlorodiphenylmethane.

ARTHUR HENRY CRAIGE, JR.

References Cited in the file of this patent

UNITED STATES PATENTS

| Number | Name | Date |
|---|---|---|
| 1,658,719 | Hardy | Feb. 7, 1928 |
| 1,707,181 | Weiler | Mar. 26, 1929 |
| 1,839,990 | Konantz | Jan. 5, 1932 |
| 2,280,340 | Miller | Apr. 21, 1942 |
| 2,334,408 | Gump | Nov. 16, 1943 |

OTHER REFERENCES

Cade, Soap and Sanitary Chemicals, Volume 20, February 1944, pages 111 to 115.